United States Patent
Gordon et al.

(10) Patent No.: US 7,063,133 B2
(45) Date of Patent: Jun. 20, 2006

(54) MULTI-WALL HEAT EXCHANGER FOR A WATER HEATER

(75) Inventors: Michael Gordon, East Grand Rapids, MI (US); Wade W. Bernreuter, Wyoming, MI (US)

(73) Assignee: Bradford White Corporation, Ambler, PA (US)

( * ) Notice: Subject to any disclaimer, the term of this patent is extended or adjusted under 35 U.S.C. 154(b) by 0 days.

(21) Appl. No.: 11/024,926

(22) Filed: Dec. 28, 2004

(65) Prior Publication Data

US 2005/0139349 A1    Jun. 30, 2005

Related U.S. Application Data

(63) Continuation-in-part of application No. 10/748,103, filed on Dec. 29, 2003.

(51) Int. Cl.
*F28D 7/04* (2006.01)

(52) U.S. Cl. .................... 165/154; 165/70; 165/163; 29/890.036

(58) Field of Classification Search .............. 165/70, 165/140, 141, 154–157, 163; 29/890.036, 29/890.03, 890.053
See application file for complete search history.

(56) References Cited

U.S. PATENT DOCUMENTS

| | | | |
|---|---|---|---|
| 149,361 A | 4/1874 | Van | |
| 164,757 A | 6/1875 | North | |
| 591,505 A | 10/1897 | Shepard et al. | |
| 1,062,015 A | 5/1913 | Lane | |
| 1,070,175 A | 8/1913 | Ponninghaus | |
| 1,240,101 A | 9/1917 | Thompson | |
| 1,255,835 A | 2/1918 | Shaug | |
| 1,560,528 A | 11/1925 | Baum | |
| 1,611,764 A | 12/1926 | Mendelson | |
| 1,717,490 A | 6/1929 | Blanding | |
| 1,738,455 A * | 12/1929 | Smith | 165/70 |
| 1,762,522 A | 6/1930 | Newell | |
| 1,805,321 A | 5/1931 | Ullman | |
| 1,921,259 A | 8/1933 | Olson | |
| 1,959,933 A | 5/1934 | Simsohn | |
| 2,051,311 A | 8/1936 | Moore | |
| 2,098,211 A | 11/1937 | Schulse | |
| 2,252,046 A | 8/1941 | Steele | |
| 2,255,956 A | 9/1941 | Watt | |

(Continued)

FOREIGN PATENT DOCUMENTS

DE    24 30 825    1/1976

(Continued)

OTHER PUBLICATIONS

Dunkirk, Artesian Indirect Water Heater, catalog, Rev. Jul. 2001.

(Continued)

*Primary Examiner*—Teresa J. Walberg
(74) *Attorney, Agent, or Firm*—RatnerPrestia

(57) ABSTRACT

A water heater including a tank having a wall defining an interior for holding water is provided. A heat exchange assembly is positioned at least partially within the interior of the tank. The heat exchange assembly has an outer tube extending within the interior of the tank. The outer tube has a wall with an inner surface. An inner tube extends within the outer tube. The inner tube has a wall with an outer surface. A gap is defined between the outer surface of the inner tube and the inner surface of the outer tube. Heat conducting fluid is contained within the gap. The fluid facilitates the transfer of heat between the inner tube and the outer tube.

24 Claims, 8 Drawing Sheets

U.S. PATENT DOCUMENTS

| | | | |
|---|---|---|---|
| 2,303,197 A | 11/1942 | Canfield | |
| 2,327,339 A | 8/1943 | Chandler | |
| 2,345,209 A | 3/1944 | Moore | |
| 2,348,610 A | 5/1944 | Colby | |
| 2,348,835 A | 5/1944 | Mueller | |
| 2,359,547 A | 10/1944 | Colby | |
| 2,373,731 A | 4/1945 | Wilson et al. | |
| 2,399,985 A | 5/1946 | Chandler | |
| 2,533,508 A | 12/1950 | Riu | |
| 2,539,469 A | 1/1951 | Powers | |
| 2,569,757 A | 10/1951 | Gubson | |
| 2,642,046 A | 6/1953 | Alexander | |
| 2,658,728 A * | 11/1953 | Evans, Jr. | 165/70 |
| 2,704,188 A | 3/1955 | Bergmann | |
| 2,798,744 A | 7/1957 | Budnick et al. | |
| 3,171,597 A | 3/1965 | Baier | |
| 3,201,045 A | 8/1965 | Davidson et al. | |
| 3,254,839 A | 6/1966 | McClanahan et al. | |
| 3,341,122 A | 9/1967 | Whittell, Jr. | |
| 3,492,461 A | 1/1970 | Lawrence | |
| 3,545,534 A | 12/1970 | Coles | |
| 3,793,992 A | 2/1974 | Marquez | |
| 3,828,847 A | 8/1974 | Stein | |
| 3,830,290 A | 8/1974 | Thamasett et al. | |
| 3,844,948 A | 10/1974 | Burke et al. | |
| 3,882,693 A | 5/1975 | Hiller | |
| 3,896,992 A | 7/1975 | Borovina et al. | |
| 3,958,755 A | 5/1976 | Cleer, Jr. | |
| 4,005,681 A | 2/1977 | Lockett | |
| 4,030,540 A | 6/1977 | Roma | |
| 4,036,621 A | 7/1977 | Burton et al. | |
| 4,037,785 A | 7/1977 | Madern | |
| 4,052,000 A | 10/1977 | Honikman | |
| 4,143,816 A | 3/1979 | Skadeland | |
| 4,149,673 A | 4/1979 | Hapgood | |
| 4,158,438 A | 6/1979 | Hapgood | |
| 4,167,211 A | 9/1979 | Haller | |
| 4,193,180 A | 3/1980 | Press | |
| 4,201,264 A | 5/1980 | Platt | |
| 4,202,406 A * | 5/1980 | Avery | 165/70 |
| 4,210,199 A | 7/1980 | Doucette et al. | |
| 4,238,873 A | 12/1980 | Frank et al. | |
| 4,253,446 A | 3/1981 | Müller | |
| 4,267,826 A | 5/1981 | Hitt, Jr. | |
| 4,272,667 A | 6/1981 | Golowacz | |
| 4,273,160 A | 6/1981 | Lowles | |
| 4,282,861 A | 8/1981 | Roark | |
| 4,296,799 A | 10/1981 | Steele | |
| 4,309,982 A | 1/1982 | Oquidam | |
| 4,318,781 A * | 3/1982 | Iida | 165/908 |
| 4,321,963 A * | 3/1982 | Bowden | 165/70 |
| 4,328,791 A | 5/1982 | Moore, Jr. et al. | |
| 4,345,583 A | 8/1982 | Morin | |
| 4,353,410 A | 10/1982 | Godard et al. | |
| 4,426,037 A | 1/1984 | Bernstein | |
| 4,461,347 A | 7/1984 | Layton et al. | |
| 4,480,631 A | 11/1984 | Kristensen | |
| 4,545,365 A | 10/1985 | Wetzel, Jr. | |
| 4,637,347 A | 1/1987 | Troy | |
| 4,738,394 A | 4/1988 | Ripka et al. | |
| 4,821,682 A | 4/1989 | Waters | |
| 4,871,014 A * | 10/1989 | Sulzberger | 165/76 |
| 4,949,680 A | 8/1990 | Kale | |
| 4,972,902 A | 11/1990 | Ninomiya | |
| 5,037,510 A | 8/1991 | Nygards | |
| 5,081,696 A | 1/1992 | Beck | |
| 5,136,985 A | 8/1992 | Krowech | |
| 5,178,207 A | 1/1993 | Bergqvist et al. | |
| 5,224,674 A | 7/1993 | Simons | |
| 5,228,413 A | 7/1993 | Tam | |
| 5,372,185 A | 12/1994 | Lannes | |
| 5,485,879 A | 1/1996 | Lannes | |
| 5,787,722 A | 8/1998 | Jenkins | |
| 5,971,444 A | 10/1999 | Hawkins | |
| 6,098,705 A | 8/2000 | Kim | |
| 6,192,583 B1 | 2/2001 | Roffelsen | |
| 6,789,615 B1 | 9/2004 | Michelfelder et al. | |
| 2003/0226716 A1 * | 12/2003 | Ploeger | 184/105.3 |

FOREIGN PATENT DOCUMENTS

| | | | |
|---|---|---|---|
| DE | 39 06 715 A1 | | 9/1990 |
| EP | 0 108 525 | * | 5/1984 |
| FR | 1499286 | | 10/1967 |
| FR | 2412807 | | 7/1979 |
| FR | 2 469 667 | | 5/1981 |
| GB | 804592 | | 11/1958 |
| JP | 57-49760 | | 3/1982 |

OTHER PUBLICATIONS

Kevin Rafferty Geo-Heat Center, "Domestic Hot Water Heating," article, Sep. 2001, pp. 18-21, GHC Bulletin.

* cited by examiner

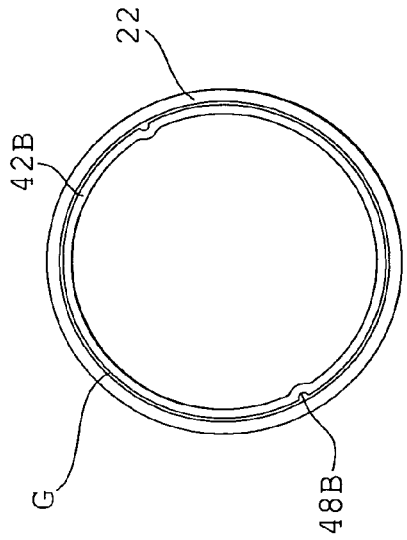
FIG. 3C
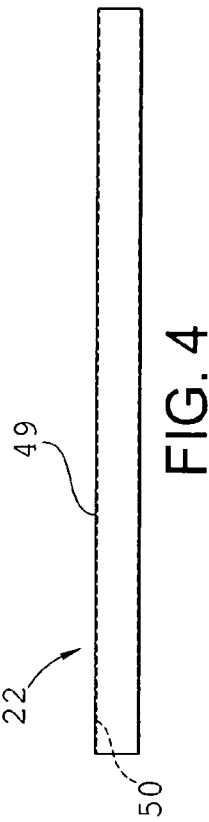
FIG. 4
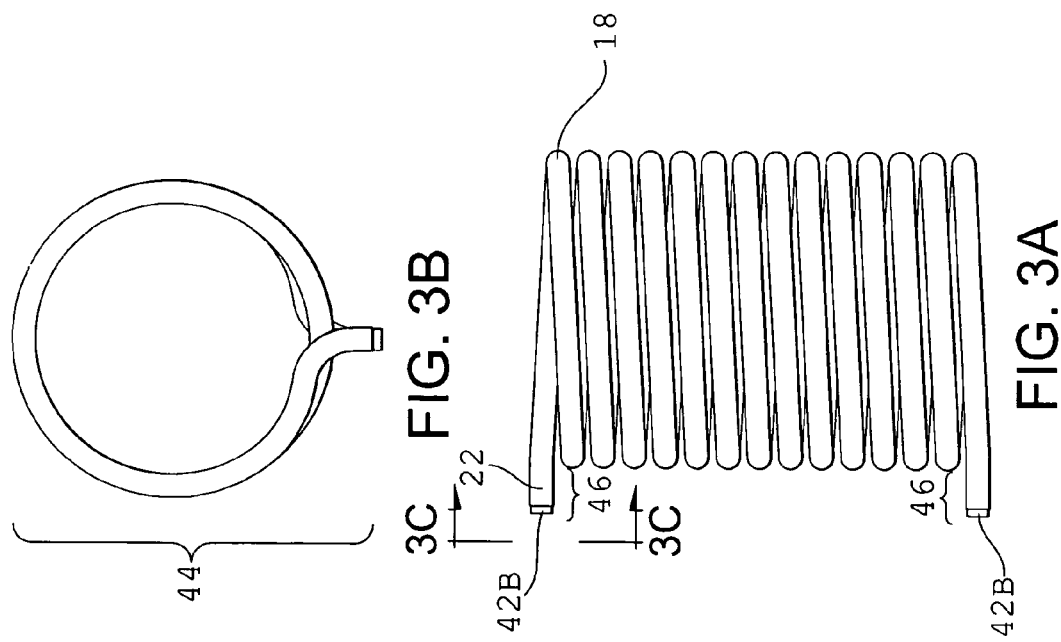
FIG. 3B
FIG. 3A

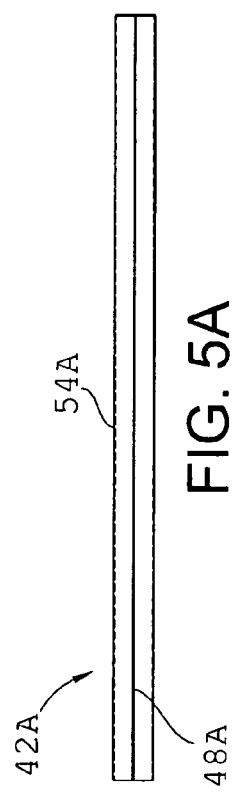
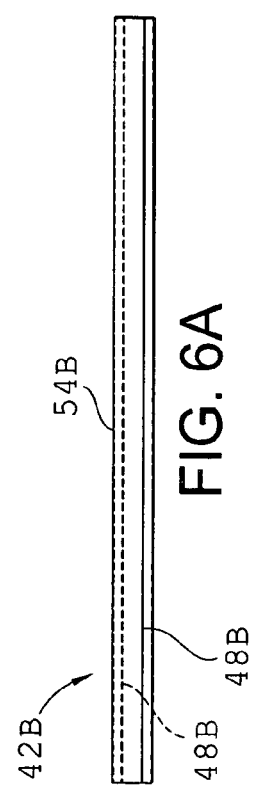
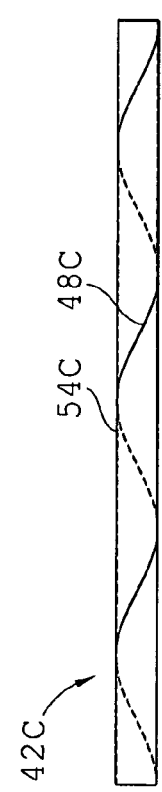
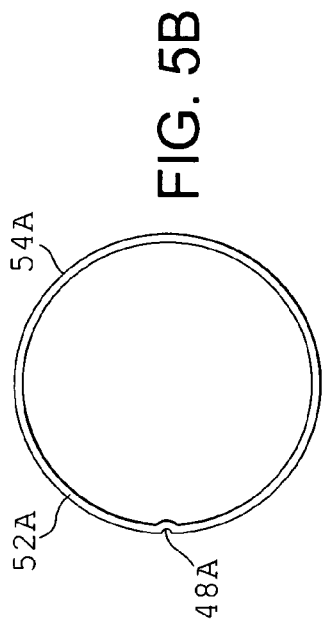
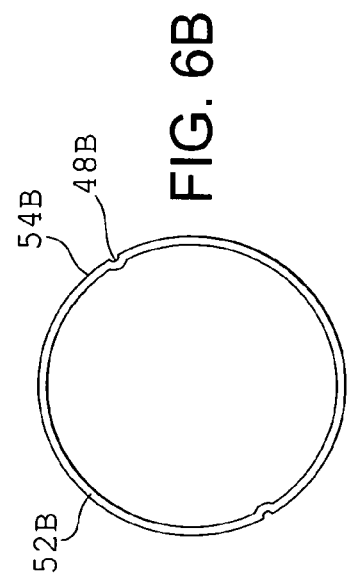
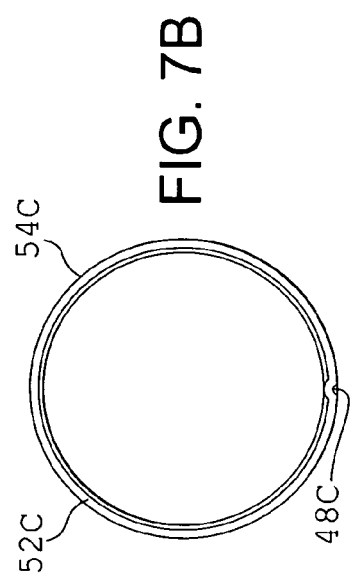

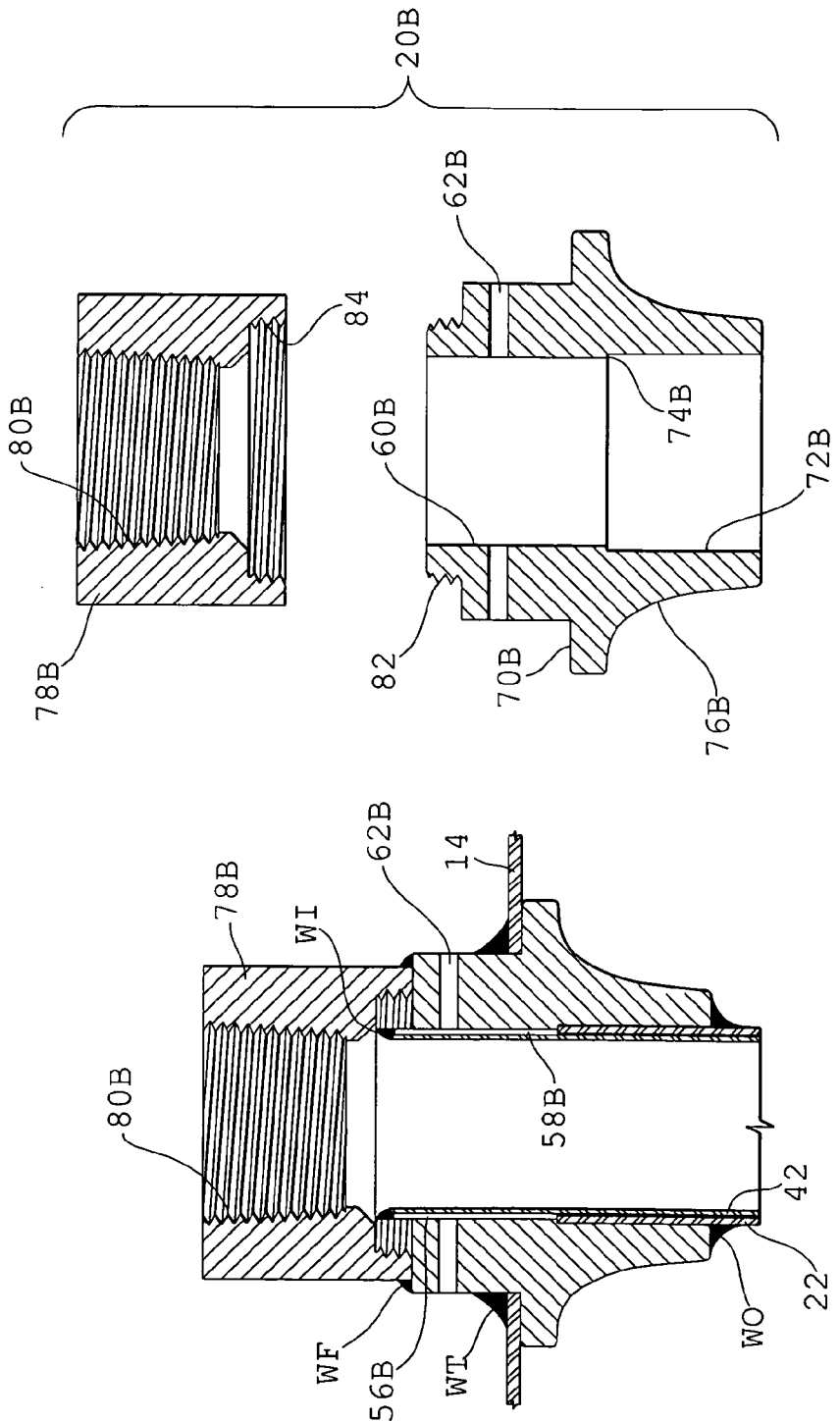

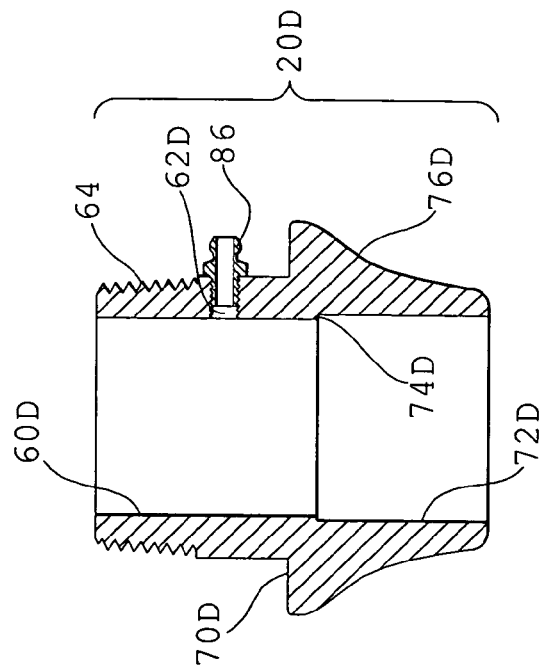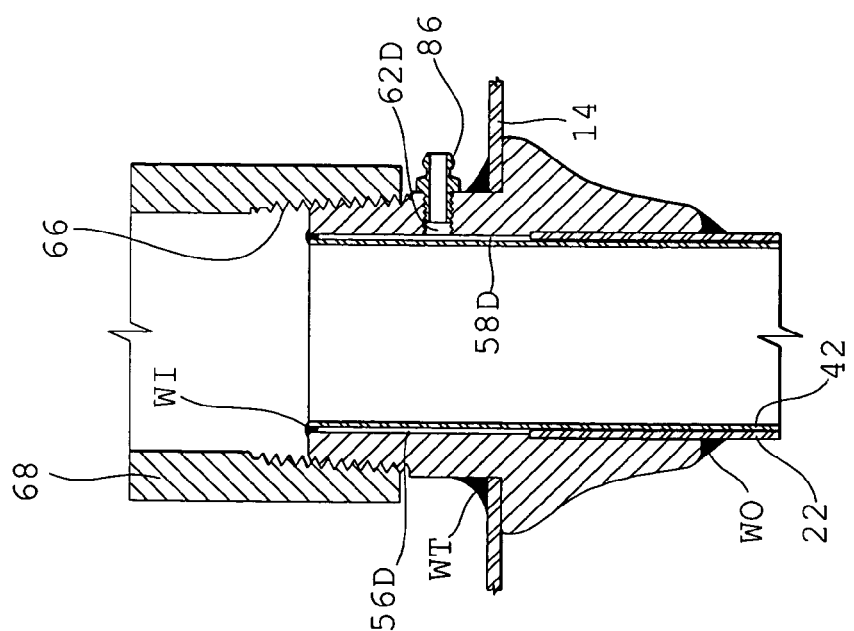
FIG. 11B
FIG. 11A

MULTI-WALL HEAT EXCHANGER FOR A WATER HEATER

This application is a continuation-in-part application of U.S. application Ser. No. 10/748,103 (pending), filed Dec. 29, 2003, which is incorporated herein by reference.

FIELD OF THE INVENTION

The present invention relates to an indirect water heater, and more particularly, a heat exchanger with a double-wall construction for use in a water tank.

BACKGROUND OF THE INVENTION

There has long been a need for compact yet efficient appliances to be installed within living areas in single and multi-family dwellings as well as in commercial establishments.

Combined water heating systems, i.e., those that provide both potable water and space heating, help to satisfy the need for compact systems for supplying hot water. However, some traditional combined water heating systems may lack protection against the mixing of potable and non-potable water.

Attempts have been made to provide a compact yet efficient combined water heating system that protects potable water from contamination. For example, U.S. Pat. No. 5,485,879 to Lannes discloses a combined water heating system for domestic or commercial use capable of heating water for consumption as well as for space heating. The '879 system comprises a double-wall construction heat exchanger coil (a non-metallic outer wall in contact with a metallic inner wall) incorporated into a standard, glass-lined water heater system. Monofilaments placed between the two walls of the heat exchanger coil provide a path along which potable or non-potable water trapped between walls can travel out of the system. While the '879 system represents a significant improvement over prior systems, continued improvements are sought.

Accordingly, there remains a need for improved heat exchange systems for use in water heater assemblies.

SUMMARY OF THE INVENTION

In one exemplary embodiment, this invention provides a water heater including a tank having a wall defining an interior for holding water. A heat exchange assembly is positioned at least partially within the interior of the tank. The heat exchange assembly has an outer tube extending within the interior of the tank. The outer tube has a wall with an inner surface. An inner tube extends within the outer tube. The inner tube has a wall with an outer surface. A gap is defined between the outer surface of the inner tube and the inner surface of the outer tube. Heat conducting fluid is contained within the gap. The fluid facilitates the transfer of heat between the inner tube and the outer tube.

In another exemplary embodiment, a heat exchange tube assembly is provided. The heat exchange tube assembly includes an outer tube having a wall with an inner surface. An inner tube is positioned within the outer tube. The inner tube has a wall with an outer surface. A gap is defined between the outer surface of the inner tube and the inner surface of the outer tube. Heat conducting fluid is contained within the gap. The fluid facilitates the transfer of heat between the inner tube and the outer tube.

In yet another exemplary embodiment, a method of forming a heat exchange tube assembly is provided. An inner tube having a wall with an outer surface is inserted within an outer tube having a wall with an inner surface. Heat conducting fluid is contained within a gap defined between the outer surface of the inner tube and the inner surface of the outer tube, thereby facilitating the transfer of heat between the inner tube and the outer tube.

In still another exemplary embodiment, a method of manufacturing a water heater is provided. An inner tube is inserted within an outer tube, thereby forming a double-walled heat exchange tube. The heat exchange tube is positioned in a tank having a wall defining an interior for holding water. Heat conducting fluid is placed within a gap defined between the inner tube and the outer tube, thereby facilitating the transfer of heat between the inner tube and the outer tube.

BRIEF DESCRIPTION OF THE DRAWINGS

FIG. 3A is a right side detail view of the double-walled heat exchange tube illustrated in FIG. 2 showing an inner tube within an outer tube;

FIG. 3B is a top view of the coiled double-walled heat exchange tube illustrated in FIG. 3A;

FIG. 3C is an end view of the double-walled heat exchange tube illustrated in FIG. 3A;

FIG. 4 is a detailed view of the outer tube (uncoiled) illustrated in FIG. 3A;

FIG. 5A is a detailed view of an embodiment of the inner tube (uncoiled) illustrated in FIG. 3A;

FIG. 5B is an end view of the inner tube illustrated in FIG. 5A;

FIG. 6A is a detailed view of another embodiment of the inner tube (uncoiled) illustrated in FIG. 3A;

FIG. 6B is an end view of the inner tube illustrated in FIG. 6A;

FIG. 7A is a detailed view of yet another embodiment of the inner tube (uncoiled) illustrated in FIG. 3A;

FIG. 7B is an end view of the inner tube illustrated in FIG. 7A;

FIG. 9A is a cross-sectional view of another embodiment of a fitting assembly configured for use with the water heater assembly illustrated in FIG. 1B;

FIG. 9B is a cross-sectional view of a fitting component of the fitting assembly illustrated in FIG. 9A;

FIG. 11A is a cross-sectional view of another embodiment of a fitting assembly configured for use with the water heater assembly illustrated in FIG. 1B; and FIG. 11B is a cross-sectional view of a fitting component of the fitting assembly illustrated in FIG. 11A.

DETAILED DESCRIPTION OF THE INVENTION

Figure 1B:
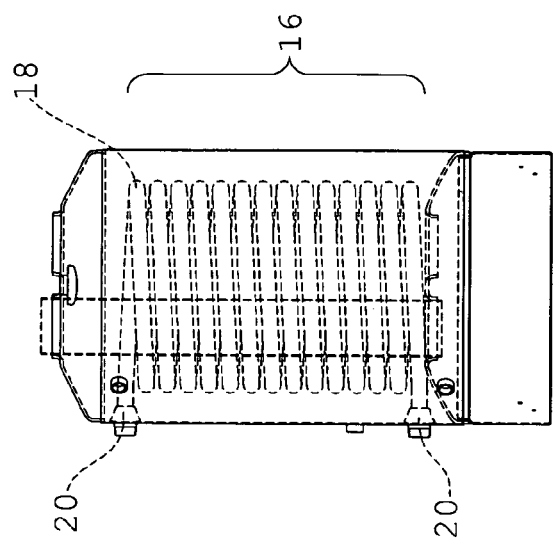
FIG. 1B is a right side view of the water heater assembly illustrated in FIG. 1A.

Although the invention is illustrated and described herein with reference to specific embodiments, the invention is not intended to be limited to the details shown. Rather, various modifications may be made in the details within the scope and range of equivalents of the claims and without departing from the invention.

Referring to the figures generally, an exemplary embodiment of a water heater 10 including a tank 12 having a wall 14 defining an interior "I" for holding water is provided. A heat exchange assembly 16 is positioned at least partially within the interior of the tank 12. The heat exchange assembly 16 includes a metallic outer tube 22 positioned within the interior "I" of the tank 12. The outer tube 22 has a wall 49 with an inner surface 50 and end portions positioned within the interior "I" of the tank 12. The heat exchange assembly 16 further includes a metallic inner tube 42 extending within the outer tube 22 and having end portions extending through the wall 14 of the tank 12. The inner tube 42 has a wall 52 with an outer surface 54. A portion of the outer surface 54 of the inner tube 42 contacts a portion of the inner surface 50 of the outer tube 22, thereby facilitating the transfer of heat between the inner tube 42 and the outer tube 22. An elongated passageway is defined between a portion of the outer surface 54 of the inner tube 42 and a portion of the inner surface 50 of the outer tube 22, thereby facilitating the flow of fluid along a length of the outer tube 22 and the inner tube 42.

In another exemplary embodiment, a heat exchange tube assembly 16 is provided. The heat exchange tube assembly 16 includes a metallic outer tube 22 having a wall 49 with an inner surface 50. A metallic inner tube 42 is positioned within the outer tube 22. The inner tube 42 has a wall 52 with an outer surface 54. The wall 49 of the outer tube 22 is thicker than the wall 52 of the inner tube 42.

In yet another exemplary embodiment, the heat exchange tube assembly 16 includes a metallic outer tube 22 having a wall 49 with an inner surface 50. An elongated passageway is defined between a portion of the outer surface 54 of the inner tube 42 and a portion of the inner surface 50 of the outer tube 22, thereby facilitating the flow of fluid along a length of the heat exchange tube assembly 16. The passageway is at least partially defined by at least one spiral groove 48C formed by the outer surface 54C of the inner tube 42C or by the inner surface 50 of the outer tube 22.

In still another exemplary embodiment, a method of forming a heat exchange tube assembly 16 is provided. The method includes the step of inserting a metallic inner tube 42 within a metallic outer tube 22. The method further includes the step of urging a portion of an outer surface 54 of the inner tube 42 and a portion of an inner surface 50 of the outer tube 22 into contact with one another, thereby facilitating the transfer of heat between the inner tube 42 and the outer tube 22. An elongated passageway is maintained between a portion of the outer surface 54 of the inner tube 42 and a portion of the inner surface 50 of the outer tube 22, thereby facilitating the flow of fluid along a length of the heat exchange tube assembly 16.

In another exemplary embodiment, a water heater 10 is provided. The water heater 10 includes a tank 12 having a wall 14 defining an interior "I" for holding water to be heated. A heat exchange tube assembly 16 extends in the interior "I" of the tank 12. The heat exchange tube assembly 16 has a metallic outer tube 22 having a wall 49 with an inner surface 50, and a metallic inner tube 42 positioned within the outer tube 22. The inner tube 42 has a wall 52 with an outer surface 54 and defines an interior for containing fluid. An elongated passageway is defined between the outer surface 54 of the inner tube 42 and the inner surface 50 of the outer tube 22, thereby facilitating the flow of fluid along a length of the heat exchange tube assembly 16. A fitting 20 extends into the interior "I" of the tank 12. The fitting 20 is sealingly coupled to the outer tube 22 and to the wall 14 of the tank 12, thereby providing a sealed passageway for any breached fluid contained between the inner tube 42 and outer tube 22 to be vented to the tank 12 exterior for heat exchanger breach recognition. The fitting 20 at least partially defines a fluid flow passageway extending between the elongated passageway and the exterior of the tank 12, thereby facilitating the flow of fluid from the elongated passageway to the exterior of the tank 12.

In yet another exemplary embodiment, a method of manufacturing a water heater 10 is provided. The method includes the step of inserting a metallic inner tube 42 within a metallic outer tube 22, thereby forming a double-walled heat exchange tube 18. The method further includes the step of positioning the double-walled heat exchange tube 18 in a tank 12 having a wall 14 defining an interior "I" for holding water, such that end portions of the outer tube 22 are within the interior "I" of the tank 12 and end portions of the inner tube 42 extend through the wall 14 of the tank 12.

In still another exemplary embodiment, a water heater 10 is provided. The water heater 10 includes a tank 12 having a wall 14 defining an interior "I" for holding water. A heat exchange assembly 16 is positioned at least partially within the interior of the tank 12. The heat exchange assembly 16 has an outer tube 22 extending within the interior "I" of the tank 12. The outer tube 22 has a wall 49 with an inner surface 50. An inner tube 42 extends within the outer tube 22. The inner tube 42 has a wall 52 with an outer surface 54. A gap "G" is defined between the outer surface 54 of the inner tube 42 and the inner surface 50 of the outer tube 22. Heat conducting fluid "F" is contained within the gap "G." The fluid "F" facilitates the transfer of heat between the inner tube 42 and the outer tube 22.

In another exemplary embodiment, a method of forming a heat exchange tube assembly 16 is provided. An inner tube 42 having a wall 52 with an outer surface 54 is inserted within an outer tube 22 having a wall 49 with an inner surface 50. Heat conducting fluid "F" is contained within a gap "G" defined between the outer surface 54 of the inner tube 42 and the inner surface 50 of the outer tube 22, thereby facilitating the transfer of heat between the inner tube 42 and the outer tube 22.

In yet another exemplary embodiment, a method of manufacturing a water heater 10 is provided. An inner tube 42 is inserted within an outer tube 22, thereby forming a double-walled heat exchange tube 18. The heat exchange tube 18 is positioned in a tank 12 having a wall 14 defining an interior "I" for holding water, such that end portions of the outer tube 22 are optionally within the interior "I" of the tank 12 and end portions of the inner tube 42 optionally extend through the wall 14 of the tank 12. Heat conducting fluid "F" is placed within a gap "G" defined between the inner tube 42 and the outer tube 22, thereby facilitating the transfer of heat between the inner tube 42 and the outer tube 22.

Figure 1C:
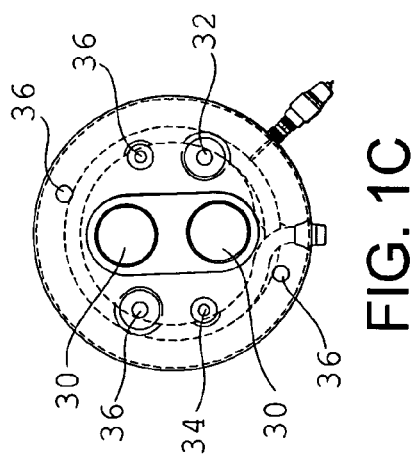
FIG. 1C is a top view of the water heater assembly illustrated in FIG. 1A.
Figure 1A:
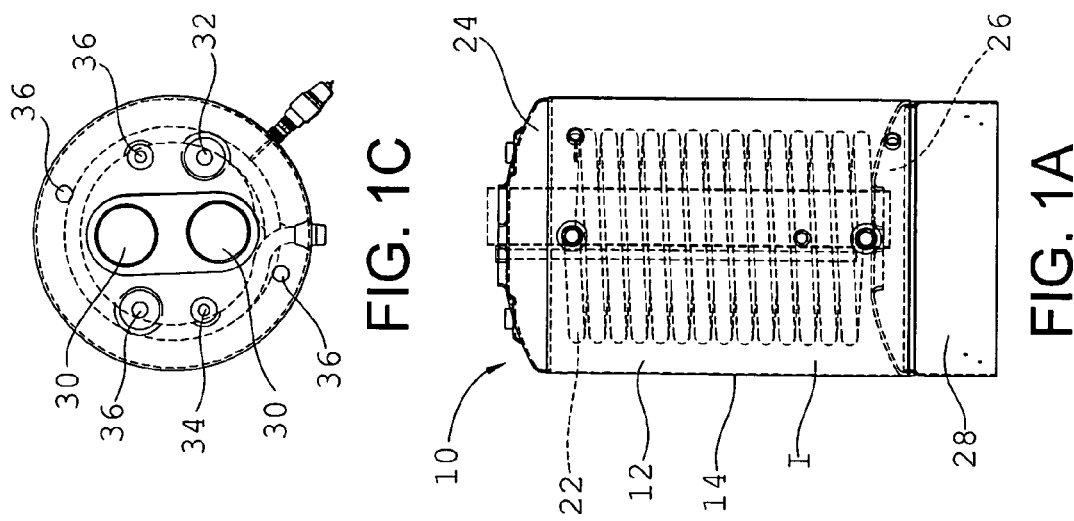
FIG. 1A is a front view of an exemplary embodiment of a water heater assembly having a heat exchange tube assembly according to aspects of this invention.

Referring now to FIGS. 1A–1C, a water heater assembly embodying exemplary aspects of this invention is generally designated by the numeral "10." FIGS. 1A–1C depict a commercial or residential water heater. However, the descriptions herein apply to commercial water heaters and residential or domestic water heaters, as well as other heat transfer systems.

The water heater assembly 10 includes a tank 12 having a wall 14 defining an interior "I" for holding water. The tank 12 has a cover portion, such as head assembly 24, and a base 26. A heat exchange tube assembly 16 is positioned within the interior "I" of the tank 12. The heat exchange tube assembly 16 includes a metallic outer tube 22 and a metallic inner tube (not shown) extending within the outer tube 22 and extending through the wall 14 of the tank 12. A fitting 20 is connected to each end of the heat exchange tube assembly 16 and to the tank wall 14 of the water heater assembly 10. The fittings 20, along with other features of the heat exchange tube assembly 16 to be identified subsequently, are configured to reduce movement of the heat exchange tube assembly 16 with respect to the water heater tank 12, as described in greater detail in U.S. patent application Ser. No. 10/677,038 entitled INDIRECT WATER HEATER AND METHOD OF MANUFACTURING SAME incorporated herein by reference.

The head assembly 24 and the base 26 are welded to the top and bottom (respectively) of the wall 14 of the water tank 12 with flues 30 welded into the head and base to form water tight seals for the containment of water within the water tank 12. The head assembly 24 is configured to include a cold water supply 32 and a hot water outlet 34. Furthermore, the water tank 12 is equipped with multiple sacrificial anodes 36 to protect the tank 12 from corrosion.

A heat source such as gas or oil is combusted beneath the base 26 of the tank 12 within a combustion chamber 28. Flues 30 extend from the base 26 through the head assembly 24 to exhaust combustion gases from the combustion chamber 28. The heat exchange tube assembly 16 surrounds the flues 30, as illustrated in FIG. 1C, terminating at the fittings 20 located at the tank wall 14. To simplify the depiction, only one of the two flues 30 is represented in FIG. 1B.

Figure 2:
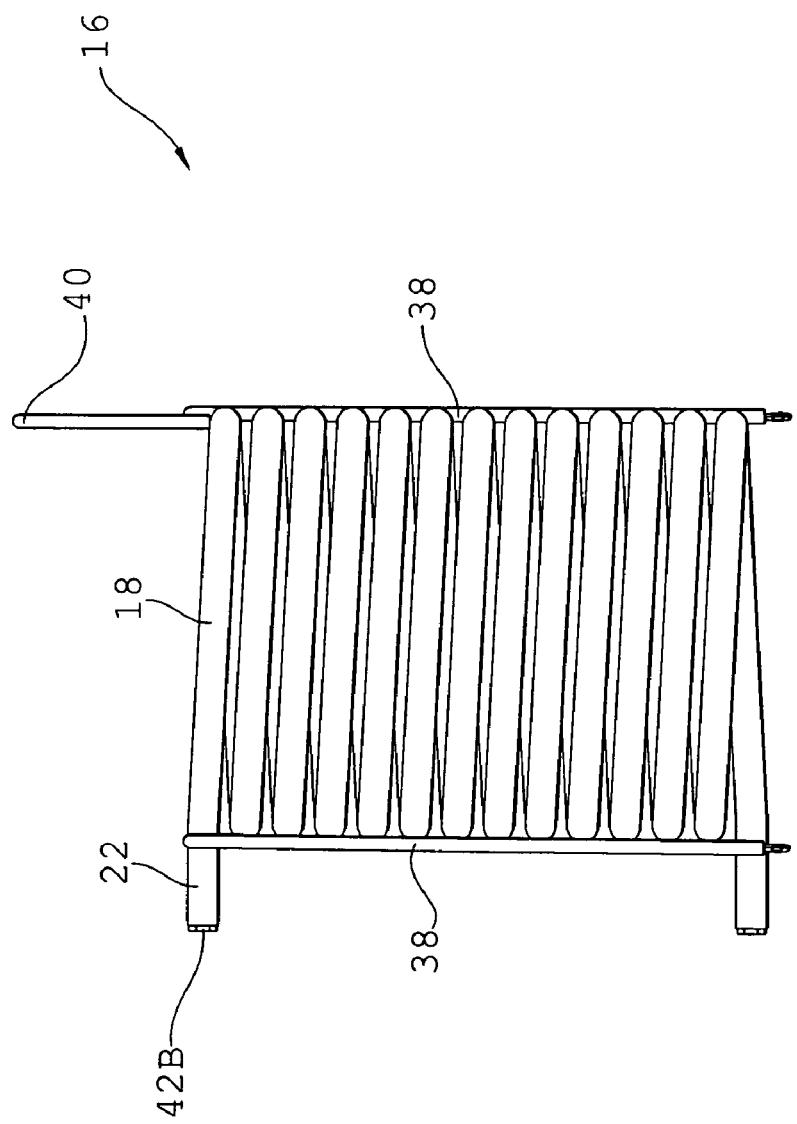
FIG. 2 is a right side detail view of a portion of the heat exchange tube assembly illustrated in FIG. 1A showing a double-walled heat exchange tube, support members, and a reinforcement member.

FIG. 2 is a detailed view illustrating additional features of the heat exchange tube assembly 16, namely support members 38 and reinforcement member 40, configured to reduce movement of the heat exchange tube assembly 16 with respect to the water heater tank 12. The support members 38 also maximize the heat transfer surface area by preventing contact between adjacent coils, and improve water circulation by fixing specific spacing between adjacent coils. Such features are described in greater detail in U.S. patent application Ser. No. 10/677,038.

FIGS. 3A–3C illustrate further details of the double-walled heat exchange tube 18 of heat exchange tube assembly 16. More specifically, FIG. 3A illustrates inner tube 42B (generally referred to as item 42) within outer tube 22. The double-walled heat exchange tube 18 is coiled 44 between end portions 46. As described previously, a fitting 20 is connected to each end portion 46 of the heat exchange tube assembly 16 and to the tank wall 14 of the water heater assembly 10.

Generally, an elongated passageway is defined between the inner tube 42 and the outer tube 22, thereby facilitating the flow of fluid along a length of the tubes 42 and 22. The elongated passageway may be defined by at least one groove 48B (generally referred to as item 48) formed by the inner tube 42. Furthermore, the elongated passageway may be defined by a gap "G" between the inner tube 42 and the outer tube 22. Such a gap "G" is formed by differences in the cross-sectional shapes of the inner surface 50 of the outer tube 22 and the outer surface 54 of the inner tube 42. Details of the functions of the elongated passageway embodiments will be described subsequently with reference to FIGS. 4–10B.

FIG. 4 is a detailed view of the outer tube 22 in an uncoiled state. The outer tube 22 has a wall 49 with an inner surface 50.

FIGS. 5A–7B illustrate various embodiments of the inner tube 42 in an uncoiled state according to aspects of this invention. Similar to the outer tube 22, each embodiment of the inner tube 42 has a wall (generally referred to as item 52) with an outer surface (generally referred to as item 54).

More specifically, FIGS. 5A and 5B illustrate an inner tube 42A with a single straight groove 48A formed by the outer surface 54A. FIGS. 6A and 6B illustrate an inner tube 42B with two straight grooves 48B formed by the outer surface 54B. FIGS. 7A and 7B illustrate an inner tube 42C with a spiral groove 48C formed by the outer surface 54C.

While various configurations of a groove can be utilized if a groove is selected to help form an elongated passageway between the inner and outer tubes, it has been discovered that several benefits are conferred by the selection of a spiral groove or a groove that is otherwise configured such that it does not extend in a straight path along the straightened tube. For example, if a spiral groove is selected, such a groove may be predictably formed by rotating a tube as it is passed through a die. Also, such a groove would evenly distribute the space formed by the groove between the inner and outer tubes, thereby distributing the segments of the heat exchange tube that may have reduced heat transfer capabilities. Finally, such a groove may also improve the strength or workability of the tube by distributing the space defined by the groove evenly about the outer circumference of the inner tube or the inner circumference of the outer tube. Again, straight, spiral, or otherwise configured grooves can be selected (if one or more grooves are utilized to help define the elongated passageway) depending upon design considerations and preferences for a particular application.

The present invention is not limited to the groove configurations illustrated in the figures. A double-walled heat exchange tube 18 may contain more than two grooves 48. The cross-sectional shape of the groove(s) 48 may be semi-circular, rectangular, V-shaped, or any other shape capable of defining an elongated passageway between a portion of the outer surface 54 of the inner tube 42 and a portion of the inner surface 50 of the outer tube 22, thereby facilitating the flow of fluid along a length of the outer tube 22 and the inner tube 42. Furthermore, the location of the groove 48 is not limited to the outer surface 54 of the inner tube 42, as it may be formed on the inner surface 50 of the outer tube 22. There are a variety of possible configurations, as long as the outer surface 54 of the inner tube 42 contacts a portion of the inner surface 50 of the outer tube 22, thereby facilitating the transfer of heat between the inner tube 42 and the outer tube 22.

The groove or grooves 48 are alternatively supplemented or replaced by the gap "G" to provide an elongated passageway. In other words, a gap "G" may be maintained or formed between the tubes 42 and 22 to facilitate the flow of trapped liquid. Such a gap "G" can cooperate with or alternatively replace one or more grooves 48.

The outer tube 22 may be compressed radially inward for contact between the inner surface 50 of the outer tube 22 and the outer surface 54 of the inner tube 42. Alternatively, the inner tube 42 may be expanded radially outwardly for contact between the outer surface 54 of the inner tube 42 and the inner surface 50 of the outer tube 22. Regardless of how the inner tube 42 and outer tube 22 are formed together, it is preferable that an elongated passageway, defined by a groove 48 and/or a gap "G," remains between the tubes to permit the venting of fluid within the interior surface 50 of the outer tube 22 and the exterior surface 54 of the inner tube 42.

The wall 52 of the inner tube 42 is typically thicker than the wall 49 of the outer tube 22. Both the inner tube 42 and the outer tube 22 are metallic. Such metallic construction of both the inner tube 42 and the outer tube 22 provides increased heat transfer by increasing conductive heat transfer.

While a thicker outer tube wall may be preferred, the inner tube wall may be thicker than the outer tube wall. It has been discovered, however, that a thicker outer tube wall can be beneficial for oxidation resistance. Such benefit arises for at least two reasons.

First, the fluid flowing through the inner tube 42 is often oxygen depleted and therefore can result in reduced oxidation of the inner tube 42 as compared to the oxidation of the outer tube 22 caused by the water (relatively oxygen rich) in the tank 12. Accordingly, the outer tube 22 is likely to oxidize or corrode at a higher rate as compared to the inner tube 42.

Second, the pressure of the water in the tank 12 is likely to be greater than that of the water circulating within the inner tube 42. Accordingly, water in the tank 12 is more likely to pass inwardly through a leak in the outer wall 49 as compared to the likelihood of water in the inner tube 42 passing outwardly through a leak in the inner wall 52.

For these and perhaps other reasons, it is beneficial to size the inner and outer tubes, 42 and 22 respectively, such that the outer tube 22 is thicker. Alternatively, whether because of the selection of particular materials for the tubes or other factors, the inner tube 42 can have the same or greater thickness as compared to the outer tube 22.

Referring now to FIGS. 8A–10B, various fitting configurations are illustrated. The fittings are generally referred to as item 20. More specifically with reference to FIG. 8A, a fitting assembly 20A extends into the interior "I" of the tank 12. The fitting assembly 20A is sealingly coupled to the outer tube 22 and to the wall 14 of the tank 12, thereby preventing the mixing of fluid in the elongated passageway and the water in the tank 12. The fitting assembly 20A at least partially defines a fluid flow passageway 56A extending between the elongated passageway and an exterior of the tank 12, thereby facilitating the flow of fluid from the elongated passageway to the exterior of the tank 12.

The fitting assembly 20A is welded to the outer tube 22 at weld "WO," the tank wall 14 at weld "WT," and the inner tube 42 at weld "WI." The fluid flow passageway 56A includes an annular passageway 58A defined by a through hole surface 60A of the fitting assembly 20A and the outer surface 54 of the inner tube 42. The fluid flow passageway 56A further includes at least one aperture 62A located outside the tank 12 and oriented at an angle relative to an axis of the inner tube 42. The angle of the embodiment illustrated in FIG. 8A is oriented substantially perpendicular relative to the axis of the inner tube 42.

Figure 8B:
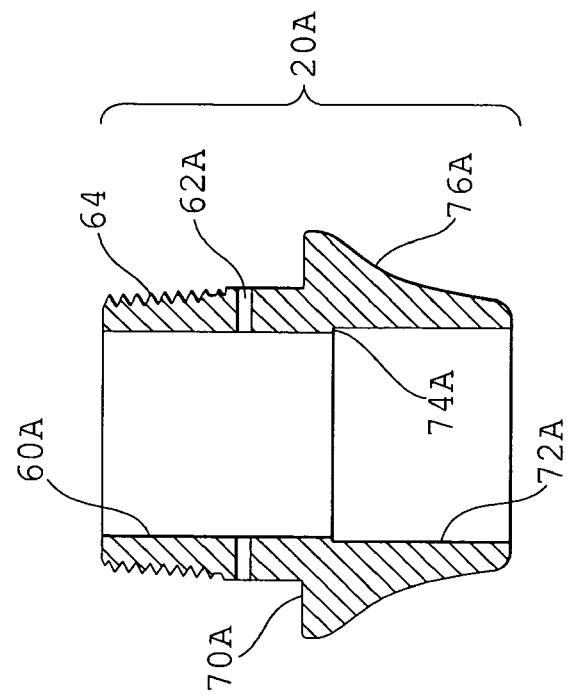
FIG. 8B is a cross-sectional view of a fitting component of the fitting assembly illustrated in FIG. 8A.
Figure 8A:
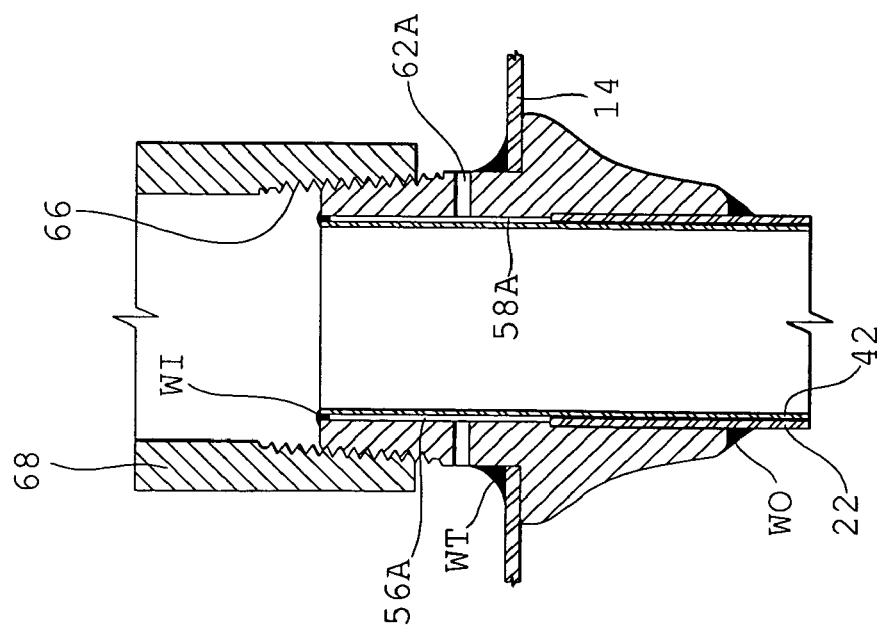
FIG. 8A is a cross-sectional view of an embodiment of a fitting assembly configured for use with the water heater assembly illustrated in FIG. 1B.

FIG. 8B illustrates further details of the fitting assembly 20A. Male threads 64 are configured to engage female threads 66 of a fitting 68 external to the water heater wall 14, as illustrated in FIG. 8A. Fitting assembly 20A further includes an annular shoulder surface 70A, a bore 72A configured to receive one of the end portions 46 of the outer tube 22, and an interior annular shoulder 74A. These features are configured to reduce movement of the heat exchange tube assembly 16 with respect to the water heater tank 12, as described in greater detail in U.S. patent application Ser. No. 10/677,038. Through hole 60A, along with the outer surface 54 of the inner tube 42, defines the annular passageway 58A as described previously. Furthermore, tapered transition 76A provides strain relief to preserve the integrity of the fitting assembly 20A and the heat exchange assembly under axial and radial forces.

The grooves 48 described previously with reference to FIGS. 5A–7B provide an improved path, i.e., an elongated passageway, along which potable or non-potable fluid trapped between the inner tube 42 and the outer tube 22 can travel out of the system. Alternatively, an elongated passageway may be defined by a gap "G" (illustrated in FIG. 3C) between the inner tube 42 and the outer tube 22. In other words, grooves 48, gap "G," or a combination of both provides an improved leak path between the inner tube 42 and outer tube 22 and over a substantial length of the heat exchange tube assembly 16. Breached potable or non-potable fluid travels along the elongated passageway to the annular passageway 58A of the fluid flow passageway 56A formed by fitting assembly 20A. The radially extending apertures 62A act as relief holes. More specifically, the radially extending apertures 62A (having openings located outside the tank wall 14) provide a path for the escape of potable or non-potable fluid that travels along the elongated passageway formed by the grooves 48 or the gap "G." Any fluid that leaks between the inner tube 42 and the outer tube 22 will travel out of the system via the elongated passageway and discharge outside the tank wall 14, thereby avoiding contamination of the potable water contained within the interior "I" of the water heater tank 12.

FIGS. 9A and 9B illustrate another embodiment of the fitting assembly, here referred to as 20B. The configuration and operation of the fitting assembly of this embodiment are essentially the same as those of fitting assembly 20A described previously with reference to FIGS. 8A and 8B, with some notable differences. Unlike fitting assembly 20A, which includes male threads 64 configured to engage female threads 66 of a fitting 68 external to the tank 12 (as illustrated in FIG. 8A), fitting assembly 20B itself includes a coupling 78B with female threads 80B configured to engage male threads of a fitting external to the tank 12. In other words, fitting assembly 20B includes two components that are connected to each other to form the fitting assembly 20B via the engagement of male threads 82 and female threads 84 (represented in FIG. 9B), further secured by fitting weld "WF." The female threads 80B engage the fitting assembly 20B to male threads of a fitting (not shown) external to the tank 12.

Similar to fitting assembly 20A, the radially extending apertures 62B of fitting assembly 20B act as relief holes for any fluid that leaks between the inner tube 42 and the outer tube 22. Also, an annular passageway 58B receives fluid from the elongated passageway between the heat exchange tubes 42 and 22. Apertures 62B and annular passageway 58B together form a fluid flow passageway 56B.

Figure 10B:
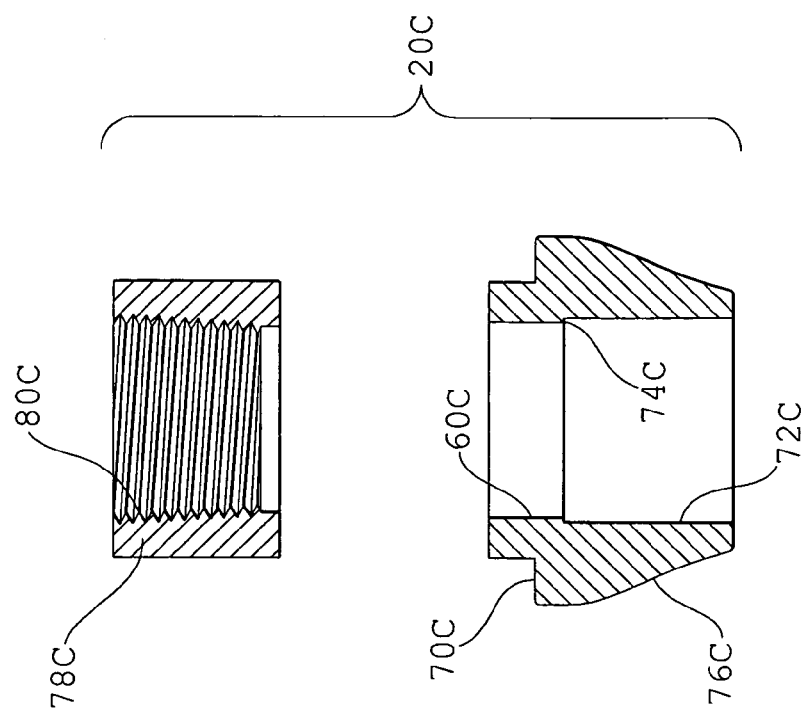
FIG. 10B is a cross-sectional view of a fitting component of the fitting assembly illustrated in FIG. 10A.
Figure 10A:
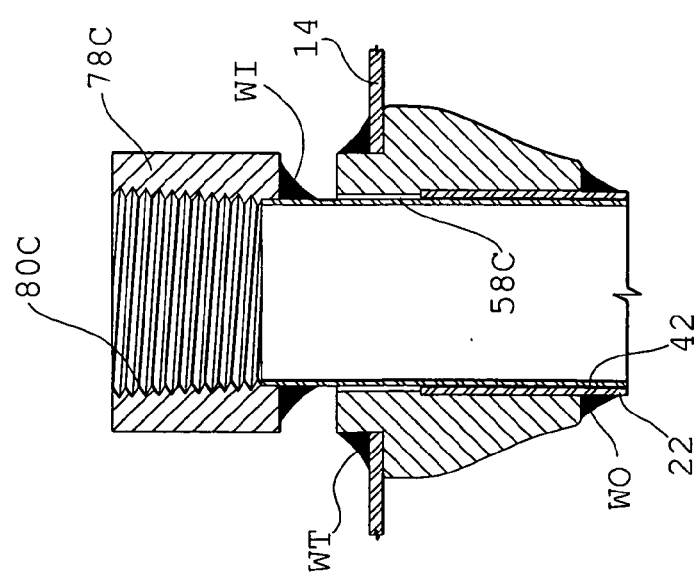
FIG. 10A is a cross-sectional view of yet another embodiment of a fitting assembly configured for use with the water heater assembly illustrated in FIG. 1B.

Referring now to FIGS. 10A and 10B, a further embodiment of the fitting assembly is illustrated, here referred to as 20C. The configuration and operation of the fitting assembly of this embodiment are essentially the same as those of fitting assembly 20A described previously with reference to FIGS. 8A and 8B, with some notable differences. Unlike fitting assembly 20A, which includes male threads 64 configured to engage female threads 66 of a fitting 68 external to the tank 12 (as illustrated in FIG. 8A), fitting assembly 20C itself includes a coupling 78C with female threads 80C configured to engage male threads of a fitting (not shown) external to the water heater 10. In other words, fitting assembly 20C includes two components that are connected to the double-walled heat exchange tube 18 to form the fitting assembly 20C. Fitting assembly 20C is welded to the outer tube 22 at weld "WO" and the tank wall 14 at weld "WT," while the coupling component 78C of the fitting assembly 20C is welded to the inner tube 42 at weld "WI." The female threads 80C engage the fitting 20C to male threads of a fitting (not shown) external to the tank 12.

Fitting assembly 20C is further distinguished from fitting assemblies 20A and 20B in that fitting assembly 20C does not include radially extending apertures (62A and 62B of fittings assemblies 20A and 20B respectively) to act as relief holes for any water that leaks between the inner tube 42 and the outer tube 22. Instead, any fluid that leaks between the inner tube 42 and the outer tube 22 will travel out of the system via the elongated passageway between the inner tube 42 and the outer tube 22 and discharge outside the tank 12 directly from an annular passageway 58C. This alternative configuration also avoids contamination of the potable water contained within the interior "I" of the water heater tank 12.

As is illustrated in FIGS. 8A–10B, each of the fittings 20A, 20B, and 20C is configured to position the end portions of the outer tube 22 such that they terminate within the interior "I" of the water heater tank 12 (i.e., inwardly from the interior surface of the wall 14 of the tank 12). In each of the exemplary embodiments shown in FIGS. 8A–10B, this is accomplished by providing a surface on the fitting that limits the position of the end portions of the outer tube 22 relative to the wall 14 of the tank 12. More specifically, each of the fitting assemblies 20A, 20B, and 20C provides an interior annular shoulder 74A, 74B, and 74C, respectively, which determines the location of the end portion of the outer tube 22. Each of the fitting assemblies 20A, 20B, and 20C also provides an annular shoulder surface 70A, 70B, and 70C, respectively, which determines the relative position of the fitting assembly 20A, 20B, and 20C with respect to the tank wall 14. By virtue of the relative position between the interior annular shoulder 74A, 74B, and 74C and the annular shoulder surface 70A, 70B, and 70C, respectively, the end portions of the outer tube 22 are maintained within the interior of the tank 12.

It has been discovered that, by positioning the ends of the outer tube 22 within the interior "I" of the tank 12, at least one benefit is achieved. Specifically, termination of the end portions of the outer tube 22 within the tank 12 makes it possible to reduce the space required on the exterior of the tank 12 for the fluid flow passageway 56A, 56B, and 56C. In other words, by forming the starting point of the fluid flow passageway 56A, 56B, and 56C within the tank's interior "I," less structure is needed on the exterior of the wall 14 of the tank 12 for the completion of the fluid flow passageway 56A, 56B, and 56C (whether by means of apertures 62A and 62B or by means of the space between the fitting coupling 78C and the remainder of fitting 20C).

In order to help achieve the benefit of space savings, it is also noted that each of the fitting embodiments illustrated in FIGS. 8A–10B extends into the interior "I" of the tank 12. Specifically, the tapered transition 76A, 76B, and 76C of each of fitting assemblies 20A, 20B, and 20C, respectively, extends into the interior "I" of the tank 12. Accordingly, the coupling (such as at weld "WO") between the fitting 20A, 20B, and 20C and the outer tube 22 can be positioned within the interior "I" of the tank 12.

Such an extension of at least a portion of the fitting 20A, 20B, and 20C into the interior "I" of the tank 12 also improves the structural integrity of the final assembly. More specifically, by placing at least a portion of the fitting 20A, 20B, and 20C within the tank 12, additional support is provided for the end portions of the tubing assembly 16 to resist any damage caused by relative movement between the coiled heat exchange tube 44 and the wall 14 of the tank 12 (e.g., during shipment, installation, and use).

An exemplary method of forming a heat exchange tube assembly 16 includes inserting a metallic inner tube 42 within a metallic outer tube 22. A portion of an outer surface 54 of the inner tube 42 and a portion of an inner surface 50 of the outer tube 22 are urged into contact with one another, thereby facilitating the transfer of heat between the inner tube 42 and the outer tube 22. An elongated passageway is maintained between a portion of the outer surface 54 of the inner tube 42 and a portion of the inner surface 50 of the outer tube 22, thereby facilitating the flow of fluid along the length of the heat exchange tube assembly 16. The urging step may include compressing the outer tube 22. Such compressing may include passing the outer tube 22 through a die. More specifically, the pre-assembly of the inner 42 and outer 22 tubes may be passed through a die having an opening smaller than the area of the cross-section of the outer tube 22, thereby forcing the outer tube 22 radially inwardly into at least partial contact with the inner tube 42.

Alternatively, the urging step may include expanding the inner tube 42. Such expanding may include pressurizing an interior of the inner tube 42, which may be accomplished by positioning pressurized liquid in the interior of the inner tube 42. More specifically, once the inner tube 42 is positioned within the outer tube 22, the inner tube 42 can be pressurized to expand it into at least partial contact with the outer tube 22. The expanding step may alternatively include forcing a mandrill through an interior of the inner tube 42. By forcing a mandrel through the inner tube 42 after it has been inserted into the outer tube 22, the inner tube 42 can be expanded into at least partial contact with the outer tube 22.

By urging a portion of an outer surface 54 of the inner tube 42 and a portion of the inner surface 50 of the outer tube 22 into contact with one another, at least one benefit can be achieved. Specifically, urging the tubes 42 and 22 into contact with one another provides an increase in the heat transfer, by conduction, between the inner tube 42 and outer tube 22. And as discussed previously, the maintenance of an elongated passageway between a portion of the outer surface 54 of the inner tube 42 and a portion of the inner surface 50 of the outer tube 22 makes it possible for fluid to flow along at least a portion of the length of the double-walled heat exchange tube 18, preferably along the entire length of the heat exchange tube 18.

In use, according to one exemplary embodiment of the invention, water from a space heating system or another source enters the water heater through the bottom fitting 20. The water then travels upwardly through the coiled tube 44 of the heat exchange tube assembly 16 aided by convection currents and/or a circulator as it is heated by exposure to hot potable water within the water storage tank 12. In other words, heat is transferred from potable water within the water storage tank 12 to a potentially non-potable fluid circulated through the coiled tube 44 of the heat exchange tube assembly 16. The fluid then exits through the top fitting 20 and travels to the space heating system or another destination. This fluid can be continuously circulated through the system as needed. The circulating fluid can optionally enter through the top fitting 20 and exit through the bottom fitting 20. The positions of the fittings 20 can be selected depending on design constraints.

FIGS. 11A and 11B illustrate another embodiment of the fitting assembly, here referred to as 20D. The configuration and operation of the fitting assembly of this embodiment are essentially the same as those of fitting assembly 20A described previously with reference to FIGS. 8A and 8B, with some notable differences. In this embodiment, a heat conducting fluid "F" is introduced between the inner tube 42 and the outer tube 22 to promote heat transfer between water in the storage tank 12 and fluid circulated through the coiled tube 44 of the heat exchange tube assembly 16.

Unlike fitting assembly 20A, which includes at least one aperture 62A located outside the tank 12 and oriented at an angle relative to an axis of the inner tube 42, fitting assembly 20D includes only one such aperture 62D, and aperture 62D is optionally threaded. A threaded zerk fitting 86 or other suitable fitting is secured to the aperture 62D to facilitate the placement of heat conducting fluid "F" within the gap "G" of the heat exchange assembly 16.

Fluid "F" is inserted or otherwise injected into the elongated passageway defined by a gap "G" (illustrated in FIG. 3C) between the inner tube 42 and the outer tube 22 through the zerk fitting 86. The fluid "F" is delivered through the zerk fitting 86 via a conventional hand-operated lever-style oil gun, for example, but may be delivered by a suitable automatic device.

By inserting fluid "F" into the gap "G" between the outer surface 54 of the inner tube 42 and the inner surface 50 of the outer tube 22, at least one benefit is achieved. Specifically, such a configuration provides an increase in the heat transfer, by conduction, between the inner tube 42 and outer tube 22. In other words, the fluid "F" facilitates the transfer of heat between the inner tube 42 and the outer tube 22.

The fluid "F" is preferably safe for human consumption so that leakage of the fluid into the water tank will not prevent use of the water contained therein. More specifically, the fluid "F" may be peanut oil, vegetable oil, or any other fluids with conductive properties. Also, any safe fluid approved by the Food and Drug Administration (FDA) may be utilized. Although water can be used as the fluid "F," a fluid having thermal conductivity properties greater than that of tap water is preferred. Also, water treated to have improved thermal conductivity is also contemplated.

Once the gap "G" of the heat exchange assembly 16 is filled with heat conducting fluid "F," the zerk fitting 86 is removed and the radially extending aperture 62D of fitting assembly 20D acts as a relief hole for any fluid that leaks between the inner tube 42 and the outer tube 22. Also, an annular passageway 58D receives fluid from the elongated passageway between the heat exchange tubes 42 and 22. Aperture 62D and annular passageway 58D together form a fluid flow passageway 56D. Alternatively, the aperture 62D may be sealed or blocked to prevent drainage of the fluid "F."

Gap "G" provides an annular receptacle between the inner tube 42 and outer tube 22 over a substantial length of the heat exchange tube assembly 16 to contain fluid "F." Also, breached potable or non-potable fluid travels along the elongated passageway to the annular passageway 58D of the fluid flow passageway 56D formed by fitting assembly 20D. The radially extending aperture 62D therefore acts as a relief hole unless it is plugged. More specifically, the radially extending aperture 62D (having an opening located outside the tank wall 14) provides a path for the escape of potable or non-potable fluid that travels along the elongated passageway formed by the gap "G." Any fluid that leaks between the inner tube 42 and the outer tube 22 will travel out of the system via the elongated passageway and discharge outside the tank wall 14, thereby avoiding contamination of the potable water contained within the interior "I" of the water heater tank 12.

Alternatively, the grooves 48 described previously with reference to FIGS. 5A–7B provide an improved path, i.e., an elongated passageway, along which potable or non-potable fluid, or fluid "F," trapped between the inner tube 42 and the outer tube 22 can travel out of the system. Accordingly, grooves 48, gap "G," or a combination of both provides an improved leak path (or receptacle) between the inner tube 42 and outer tube 22 over a substantial length of the heat exchange tube assembly 16 as described above.

The embodiment of the zerk fitting 86 secured to the aperture 62D of fitting 20D to facilitate the placement of heat conducting fluid "F" within the gap "G" of the heat exchange assembly 16, as described above with reference to FIGS. 11A and 11B, may apply to the fitting 20B illustrated in FIGS. 9A and 9B. The configuration and operation of the fitting assembly of this embodiment are essentially the same as those of fitting assembly 20D described previously with reference to FIGS. 11A and 11B.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. A water heater comprising:
   a tank having a wall defining an interior for holding water;
   a heat exchange assembly positioned at least partially within said interior of said tank, said heat exchange assembly having
   an outer tube extending within said interior of said tank, said outer tube having a wall with an inner surface;
   an inner tube extending within said outer tube, said inner tube having a wall with an outer surface;
   a gap defined between said outer surface of said inner tube and said inner surface of said outer tube;
   heat conducting fluid contained within said gap, said fluid facilitating the transfer of heat between said inner tube and said outer tube; and
   a fitting being sealingly coupled to said outer tube and to said wall of said tank, said fitting at least partially defining a fluid flow passageway extending between said gap and an exterior of said tank, thereby facilitating the flow of heat conducting fluid from said exterior of said tank to said gap.

2. The water heater of claim 1, wherein said gap is an annular passage.

3. The water heater of claim 1, wherein said fluid is safe for human consumption.

4. The water heater of claim 1, wherein said fluid is liquid.

5. The water heater of claim 4, wherein said liquid is selected from the group consisting of peanut oil and vegetable oil.

6. The water heater of claim 1, wherein said fitting extends into said interior of said tank.

7. The water heater of claim 1 wherein said fluid flow passageway comprises an aperture defined by said fitting and located exterior to said tank.

8. The water heater of claim 7, further comprising a zerk fitting secured to said aperture, thereby facilitating the placement of said fluid within said gap.

9. The water heater of claim 1, wherein said outer tube has end portions positioned within said interior of said tank.

10. The water heater of claim 1, wherein said inner tube has end portions extending through said wall of said tank.

11. The water heater of claim 1, wherein said wall of said inner tube is thicker than said wall of said outer tube.

12. The water heater of claim 1, wherein said outer tube is metallic.

13. The water heater of claim 1, wherein said inner tube is metallic.

14. The water heater of claim 1, wherein said fitting is welded to said outer tube.

15. The water heater of claim 1, wherein said fitting is welded to said tank.

16. The water heater of claim 1, wherein said fitting is welded to said inner tube.

17. The water heater of claim 1, wherein an elongated passageway is defined between a portion of said outer surface of said inner tube and a portion of said inner surface of said outer tube, thereby facilitating the flow of leaked fluid along a length of said outer tube and said inner tube.

18. The water heater of claim 17, wherein said passageway is at least partially defined by at least one groove formed by said outer surface of said inner tube or by said inner surface of said outer tube.

19. The water heater of claim 18, wherein said groove is spiral.

20. The water heater of claim 18, wherein said groove is formed by said outer surface of said inner tube.

21. The water heater of claim 18, wherein said groove is formed by said inner surface of said outer tube.

22. A coiled heat exchange tube assembly comprising:
   a coiled outer tube having a wall with an inner surface;
   a coiled inner tube positioned within said coiled outer tube, said coiled inner tube having a wall with an outer surface;
   a gap defined between said outer surface of said coiled inner tube and said inner surface of said coiled outer tube; and
   heat conducting fluid contained within said gap, said fluid facilitating the transfer of heat between said coiled inner tube and said coiled outer tube.

23. A method of forming a coiled heat exchange tube assembly comprising the steps of:
   inserting an inner tube having a wall with an outer surface within an outer tube having a wall with an inner surface;
   coiling the outer tube and the inner tube, thereby forming a coiled double-walled heat exchange tube; and
   containing heat conducting fluid within a gap defined between the outer surface of the inner tube and the inner surface of the outer tube, thereby facilitating the transfer of heat between the inner tube and the outer tube.

24. A method of manufacturing a water heater comprising the steps of:
   inserting an inner tube within an outer tube, thereby forming a double-walled heat exchange tube and defining a gap between the inner tube and the outer tube;
   positioning the heat exchange tube in a tank having a wall defining an interior for holding water;
   coupling a fitting to the outer tube and to the wall of the tank, the fitting at least partially defining a fluid flow passageway extending between the gap and an exterior of the tank, thereby facilitating the flow of heat conducting fluid from the exterior of the tank to the gap; and
   placing heat conducting fluid within the gap, thereby facilitating the transfer of heat between the inner tube and the outer tube.

* * * * *